US009298585B1

(12) United States Patent
Sharp et al.

(10) Patent No.: US 9,298,585 B1
(45) Date of Patent: Mar. 29, 2016

(54) BLACKLISTING OF FAULT GENERATING SOFTWARE CODE

(71) Applicant: Google Inc., Mountain View, CA (US)

(72) Inventors: Chris Sharp, Montreal (CA); Robert Shield, Vaudreuil-Dorion (CA)

(73) Assignee: Google Inc., Mountain View, CA (US)

( * ) Notice: Subject to any disclaimer, the term of this patent is extended or adjusted under 35 U.S.C. 154(b) by 135 days.

(21) Appl. No.: 14/156,394

(22) Filed: Jan. 15, 2014

Related U.S. Application Data

(60) Provisional application No. 61/922,020, filed on Dec. 30, 2013.

(51) Int. Cl.
G06F 11/00 (2006.01)
G06F 11/36 (2006.01)
G06F 11/22 (2006.01)

(52) U.S. Cl.
CPC .......... *G06F 11/362* (2013.01); *G06F 11/2294* (2013.01)

(58) Field of Classification Search
CPC .................................................. G06F 11/362
USPC ........... 714/37, 38.1, 38.11, 38.12, 38.14, 4.1
See application file for complete search history.

(56) References Cited

U.S. PATENT DOCUMENTS

| 7,739,551 | B2 | 6/2010 | Eickmeyer et al. | |
|---|---|---|---|---|
| 7,849,502 | B1 * | 12/2010 | Bloch et al. | 726/11 |
| 8,020,149 | B2 | 9/2011 | Wolf | |
| 8,516,308 | B1 | 8/2013 | Gill et al. | |
| 8,555,258 | B2 | 10/2013 | Warren et al. | |
| 8,874,970 | B2 * | 10/2014 | Benedek et al. | 714/38.11 |
| 2010/0306847 | A1 * | 12/2010 | Lambert et al. | 726/24 |
| 2011/0209008 | A1 * | 8/2011 | Arapov | 714/48 |

OTHER PUBLICATIONS

Dang, et al., "ReBucket: A Method for Clustering Duplicate Crash Reports Based on Call Stack Similarity", 2012, 10 pgs.

* cited by examiner

*Primary Examiner* — Dieu-Minh Le
(74) *Attorney, Agent, or Firm* — McDermott Will & Emery LLP

(57) ABSTRACT

Techniques for blacklisting of fault generating software code are provided. An example method includes receiving crash reports of a plurality of browsers, a crash report including an identification of one or more executables related to a software crash of a browser, wherein software code of the executables is included in a memory space of the browser during the software crash, analyzing the crash reports of the browsers to determine a browser component affected by software code of an executable included in respective memory spaces of the browsers to cause one or more software crashes of the browsers, computing, for the executable, a fault level based on a number of crashes of the browser component that is associated with the executable and a number of crashes of the browser component independent of the executable, and including an identifier representing the executable in a list based on the determined fault level.

20 Claims, 4 Drawing Sheets

BLACKLISTING OF FAULT GENERATING SOFTWARE CODE

RELATED APPLICATIONS

This application is a non-provisional of U.S. Provisional Patent Application No. 61/922,020, filed on Dec. 30, 2013 and titled "Blacklisting of Fault Generating Software," all of which is herein incorporated in its entirety by reference.

FIELD

The present disclosure relates generally to software applications and particularly to software application faults.

BACKGROUND

An application, such as a web browser, may experience operational faults or "crashes" when executing at a user's device. In some cases, such crashes may occur due to third-party software that executes at the user's device. Such third-party software may include or inject executable code into a memory space of the application. When such third-party executable code is faulty or "buggy," the application may crash. This degrades user experience when using the application particularly because such crashes are largely unpredictable. Furthermore, it is often not possible to prevent such crashes by modifying faulty third-party software code because third-party software code can be proprietary and unavailable for modification.

SUMMARY

The disclosed subject matter relates to blacklisting of fault generating software code.

An example method includes receiving crash reports of a plurality of browsers, a crash report including an identification of one or more executables related to a software crash of a browser, wherein software code of the executables is included in a memory space of the browser during the software crash, analyzing the crash reports of the browsers to determine a browser component affected by software code of an executable included in respective memory spaces of the browsers to cause one or more software crashes of the browsers, computing, for the executable, a fault level based on at least a number of crashes of the browser component that is associated with the executable and a number of crashes of the browser component independent of the executable, and including an identifier representing the executable in a list of blacklisted executable identifiers based on the determined fault level of the executable.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several configurations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The disclosed subject matter relates to blacklisting of fault generating software code.

In some implementations, crash reports are received from a plurality of browsers. The crash reports may be received at a server from one or more computing devices. A crash report may include an identification of one or more executables related to a software crash of a browser. Software code of the executables may be included in a memory space of the browser during the software crash.

In some implementations, the crash reports may be analyzed to determine a browser component affected by software code of an executable included in respective memory spaces of the browsers to cause one or more software crashes of the browsers. In some implementations, a fault level of the executable may be computed based on at least a number of crashes of the browser component that is associated with the executable and a total number of crashes of the browser component independent of (or without regard to) the executable. An identifier of the executable may then be included in a list of blacklisted executable identifiers based on the determined fault level of the executable.

In some implementations, the list of the blacklisted executable identifiers may be provided to the plurality of browsers. The browsers may prevent future inclusion of the software code of the identified blacklisted executables into respective memory spaces of the browser. This may prevent future crashes of the browser component resulting from the executable at respective browsers and can result in increased operational stability of the browsers. Improved operational stability of a browser can enhance a user's browsing experience.

Figure 1:
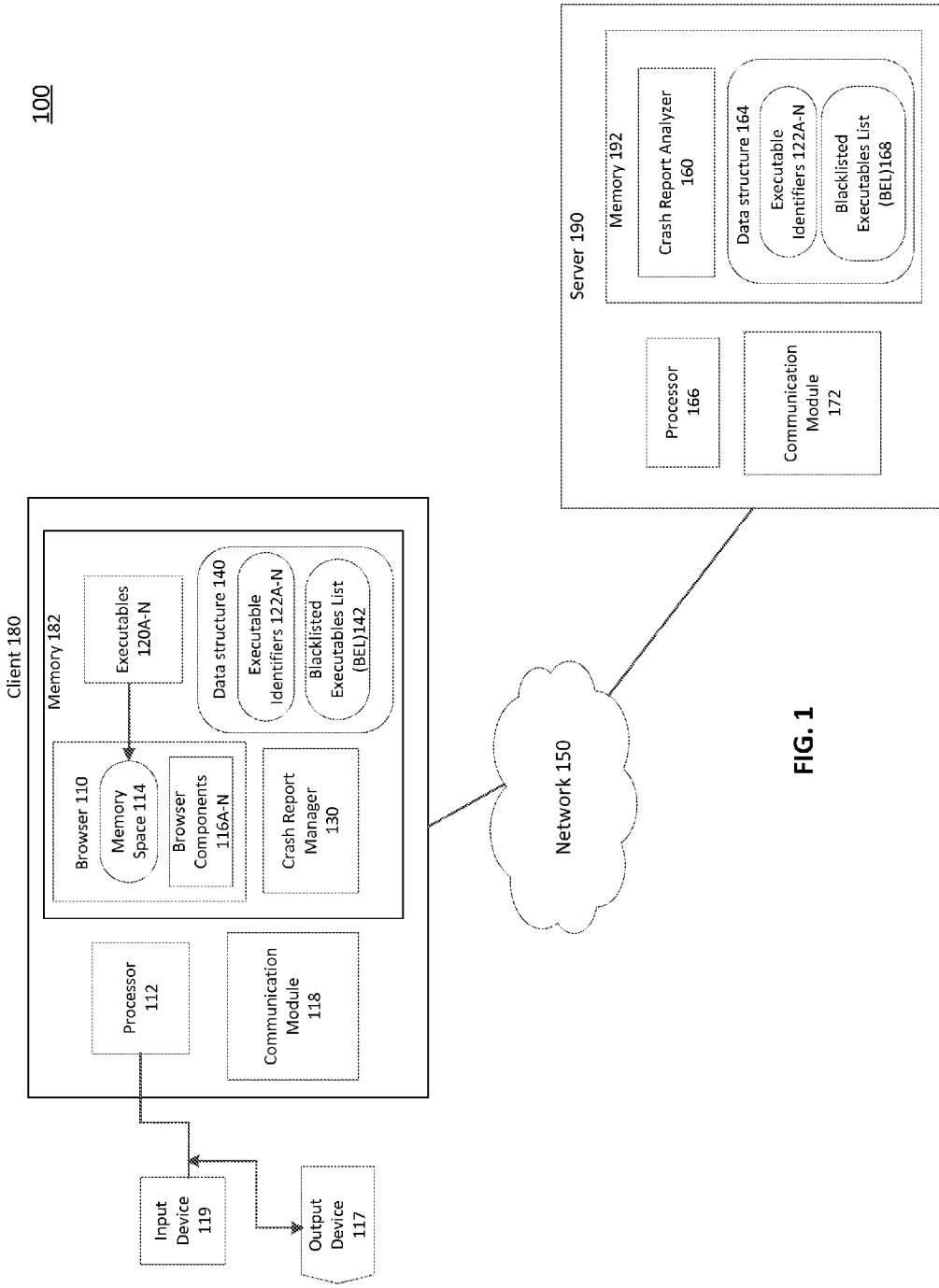
FIG. 1 is a diagram of an example network environment suitable for practicing an implementation of the subject technology.

FIG. 1 illustrates example architecture 100 for blacklisting of fault generating software code. Architecture 100 includes client 180 and server 190 connected over network 150.

Client 180 includes processor 112, communication module 118 and memory 182. Memory 182 includes browser 110, memory space 114, executables 120A-N, executable identifiers 122A-N identifying respective executables 120A-N, crash report manager 130, data structure 140 and blacklisted executables list (BEL) 142. Output device 117 can include a touch screen display or any other graphic display. Client(s) 180 also includes input device 119, such as a keyboard, touch-screen, or mouse, to receive user input. Processor 112 of client 180 can be configured to execute instructions, such as instructions physically coded into processor 112 and instructions received from software (e.g., crash report manager 130) in memory 182. For example, processor 112 of client 180 executes instructions from crash report manager 130 to modify or update BEL 142 in data structure 140.

Client 180 can be, for example, desktop computers, laptop computers, mobile devices (e.g., a smartphone, tablet computer, or PDA), set top boxes (e.g., for a television), video game consoles, or any other devices having appropriate processor, memory, and communications capabilities. Client 180 is configured to execute applications that can be, for example, search applications, web browsers, reading applications, communication applications, or any other software application. It is to be appreciated that the disclosed implementations are not limited to browsers and can operate with or be included within any software application. Although FIG. 1 illustrates a single client 180, it is to be appreciated that the disclosed implementations can be configured to communicate with a plurality of clients. Such communication may include, but is not limited to, providing blacklisted executable identifiers to the plurality of clients.

Server 190 includes processor 166, communication module 172 and memory 192. Memory 192 further includes crash report analyzer 160, data structure 164 including executable identifiers 122A-N identifying respective executables 120A-N (received from client 180) and BEL 168. Processor 166 of server 190 can be configured to execute instructions, such as instructions physically coded into processor 166 and instructions received from software (e.g., crash report analyzer 160) in memory 192. For example, processor 166 of server 190 executes instructions from crash report analyzer 160 to modify or update BEL 168.

Network 150 can include, for example, any one or more of a personal area network (PAN), a local area network (LAN), a campus area network (CAN), a metropolitan area network (MAN), a wide area network (WAN), a broadband network (BBN), the Internet, and the like. Further, network 150 can include, but is not limited to, any one or more of the following network topologies, including a bus network, a star network, a ring network, a mesh network, a star-bus network, tree or hierarchical network, and the like.

Client 180 and server 190 are connected over network 150 via respective communications modules 118 and 168. The communications modules 118 and 168 are configured to interface with the network 150 to send and receive information, such as data, requests, responses, and commands to other devices on the network. Communications modules 118 and 168 can be, for example, modems or Ethernet cards. In an example, data related to blacklisting of fault generating software code is exchanged between client 180 and server 190 over network 150.

In an example and non-limiting overall operation, crash report analyzer 130 may generate crash reports based on software crashes of browser 110 at clients 180. These crash reports may be provided to server 190 where they can be further analyzed by crash report analyzer 160. The crash reports may include one or more executable identifiers 122A-N (e.g., file names, library names, etc.) corresponding to respective executables 120A-N. For example, executable identifier 122A can correspond and identify executable 120A.

Executables 120A-N may include executables that are software fault generating or "buggy." Based on the analysis of the crash reports, crash report analyzer 160 blacklists or places one or more blacklisted executable identifiers from executable identifiers 122A-N in BEL 168. Contents of BEL 168, including the blacklisted executable identifiers, may be provided to crash report manager 130 at client 180. The blacklisted executable identifiers may correspond to one or more executables 120A-N that may be fault generating and are to be blacklisted.

Crash report manager 130 may update contents of BEL 142 at client(s) 180 to include the blacklisted identifiers. BEL 142 can read by browser 110 and software code of one or more executables 120A-N, corresponding to the blacklisted executable identifiers, is blocked or prevented by browser 110 from future inclusion into memory space 114 of the browser. In some non-limiting implementations, crash report manager 130 in browser 110 may be configured to perform such blocking or prevention. This may prevent future crashes of browser components 116A-N resulting from one or more blacklisted executables and can result in increased operational stability of the browser. Improved operational stability of the browser can enhance a user's browsing experience.

In some implementations, browser 110 may execute in a memory 182 of client 180. Browser 110 can be a web browser that allows a user to browse web content. In some implementations, browser 110 may be a tab-view browser. Such a tab-view browser may be a multi-process browser where each tab of the browser may be instantiated as a separate process in memory 182. Browser 110 may access memory space 114 that may be used by the browser 110 for operation of browser 110. Browser components 116A-N may include a rendering engine component, a browser process component, a mark-up language parser component, browser history component or any other browser processes or components. Browser components 116A-N may also access memory space 114 during operation of browser 110. It is to be appreciated that the disclosed implementations are not limited to browsers and can apply to other applications that access content from a server. Such applications may include, but are not limited to, mobile and smartphone applications that are not browsers.

In some implementations, executables 120A-N may include executable software code, processes or libraries associated with applications distinct from browser 110 executing at client 180. As an example, executables 120A-N may be link libraries (e.g., dynamic link libraries) or any other type of software code. Executables 120A-N may include software code that may be injected into memory space 114 of browser 110. In some scenarios, executables 120A-N and their software code may be buggy or faulty. When such faulty software operates in memory space 114 of browser, the faulty software may affect operation of one or more browser components 116A-N terminating operation of the browser components 116A-N or making the browser components 116A-N unstable. When the browser components 116A-N become unstable or inoperational, browser 110 may itself crash or terminate operation.

As noted above, executables 120A-N may include executable software code, processes or libraries associated with applications distinct from browser 110 executing at client 180. Consider an illustrative example where an executable 120K is a link library associated with an anti-virus application executing at client 110. The anti-virus application, which can be an application distinct from browser 110, may inject executable 120K as software code into memory space 114 of browser 110. When the executable 120K becomes unstable or experiences a fault in the memory space 114 of browser 110, a browser process component 116K that also utilizes memory space 114 may terminate or suspend operation. This may result in crashing or termination of browser 110 or one or more browser tabs of browser 110.

Consider another illustrative example where an executable 120L is a link library associated with a video player application executing at client 110. The video player application, which is an application distinct from browser 110, may inject executable 120L as software code into memory space 114 of browser 110. When the executable 120L becomes unstable or experiences a fault in the memory space 114 of browser 110, a browser rendering engine component 120L may terminate or suspend operation, crashing browser 110 or one or more browser tabs of browser 110.

In some implementations, crash report manager 130 may detect instability in memory space 114 by monitoring operation of memory space 114. Crash report manager 130 may detect any faults in memory space 114 that are being caused by executables 120A-N. Crash report manager 130 may also identify one or more browser components 116A-N affected by executables 120A-N. Crash report manager 130 may detect imminent or actual termination of browser 110, browser components 116A-N and one or more executables in memory space 114.

In some implementations, when one or more of such conditions (e.g., instability, faults, imminent termination, uncharacteristic memory use, etc.) are detected or upon actual termination of one or more browser components 116A-N (or even browser 110), crash report manager 130 may generate a crash report. In some implementations, the crash report may be a file or any data structure that includes, but is not limited to, executable identifiers 122A-N of executables 120A-N in memory space 114 at a time or approximately at the time of the crash, or time indicating at least when the executables 120A-N were injected into memory space 114, a list or identification or one or more browser components 116A-N that are affected or crashed as a result of one or more executables 120A-N.

In some implementations, the crash report may include a capture or record of memory space 114 at the time of the crash. Such a memory capture may include one or more parameters of memory 114 (e.g., memory utilization) at the time or near the time of the crash. The crash report may also include an identification code for browser 110. Such an identification code can be any numeric or alpha-numeric value or string that can uniquely identify a browser such as browser 110. In situations in which the systems discussed here collect information about browsers, or may make use of browser information, users of the browsers may be provided with an opportunity to control whether programs or features collect or share crash report information. Thus, a user may have control over how information is collected about a browser and used by a server.

In some implementations, the crash report(s) is provided by crash report manager 130 to crash report analyzer 160 at server 190 over network 150. The crash report may also be stored in data structure 140. Crash report analyzer 160 may parse or read the crash report to determine a time or approximately the time of the crash, executable identifiers 122A-N of executables 120A-N in memory space 114 at a time or approximately at the time of the crash, a time indicating at least when executables 120A-N were injected into memory space 114, a list or identification or one or more browser components 116A-N that were affected or crashed as a result of one or more executables 120A-N. Other clients distinct from client 180 may include their respective crash report managers 130 that provide their crash reports including browser identification codes. In this way, crash report analyzer 160 may receive crash reports from a plurality of browsers and clients 180.

In some implementations, crash report manager 130 may store reports of crashes of browser 110 in data structure 164 as the reports are being generated. The reports may then be provided to server 190 at pre-determined intervals of time (e.g., 1 hour intervals) or on-the-fly as the reports are being generated. For example, if during a particular time span, crash report manager 130 generated and an 'n' number of crash reports, the 'n' crash reports may be provided together as respective or combined files to crash report analyzer 160 at server 190.

In some implementations, crash report analyzer 160 may store or aggregate the crash reports received from crash report managers at one or more clients 180 in data structure 164. Such stored crash reports may be further analyzed by crash report analyzer 160 to determine patterns of crash activity of browsers and browser components operating at the clients. Such patterns may include data such as rates of increase or decrease of crashes associated with one or more executables 120A-N, identifications of highest, lowest, median and average levels (or values) of crashes of the executables 120A-N, etc. These examples are purely illustrative and are not intended to limit the embodiments.

In some implementations, the stored crash reports received from the one or more clients 180 may be used by crash report analyzer 160 to determine heuristics or one or more blacklisting rules. Such blacklisting rules may specify when identifiers of one or more executables 120A-N may need to be included in or excluded from BEL 168. In some implementations, such blacklisting rules may be modified by crash report analyzer 160 based on changes to the determined patterns of crash activity received from browsers operating at one or more clients.

In some implementations, crash report analyzer 160 may store a count of a total number of unique browser identification codes in data structure 164 to determine a number (e.g., total number) of crashes associated with a particular browser (e.g., browser 110) as well as a number of crashes of other browsers operating on the other clients.

In some implementations, crash report analyzer 160 identify, from a crash report, one or more approved executables supporting operation of 110 browser. These approved executables may be executables that may be needed to support the operation of browser 110. In other words, if such executables are blocked from operation, browser 110 may no longer be able to operate. Crash report analyzer 160 may remove or filter out such approved executables from the crash report. Crash report analyzer 160 may also block inclusion of identifiers of the approved executables into BEL 168. In some implementations, a time indicating when an executable was injected into memory space 114 may be used to further distinguish two or more executables having the same identifying name.

In some implementations, crash report analyzer 160 may identify one or more executables 120A-N that affect a number of browsers less than a particular threshold number of browsers. Such identification may be performed based on a count of unique browser crashes associated with one or more executables 120A-N in crash reports from clients 180. Crash report analyzer 160 may remove or filter out identifiers of such threshold executables from the crash report. For example, if it is determined by crash analyzer 160 that executable 120B affects 10 browsers out of a total of 10,000 browsers, crash report analyzer 160 may block inclusion of an identifier of executable 120B in BEL 168. Because executable 120B, affects a small number of browsers (e.g., 10) relative to the total number of browsers (e.g., 10,000), it may be possible that executable 120B is associated with a user's personally developed executable or an executable that is in development. By blocking inclusion of the executable 120B's identifier into BEL 168 and subsequently from BEL 142 when the content of BEL 168 is provided to BEL 142, crash report analyzer 160 may allow executable 120B to continue operating in memory space 114 of browser 110 because it is not blacklisted from inclusion into memory space 114.

Executable identifiers 122A-N that may remain after filtering identifiers of the approved executables or executables that affect a number of users less than a threshold may then be further analyzed by crash report analyzer 160 to determine a fault level for the executables 120A-N. In some implementations, the filtering of one or more executable identifiers 122A-N corresponding to executables 120A-N may be performed at any time prior to computation of fault levels for executables 120A-N or during the computation of fault levels for executables 120A-N.

In some implementations, crash report analyzer 160 may compute a fault level of an executable, such as executable 120A, based on at least a number of crashes of a browser component 116A that is associated with executable 120A and a number of crashes of the browser component 116A independent of the executable 120A. In some implementations, crash report analyzer 160 may compute a ratio of the number of crashes of the browser component 116A that are associated with the executable 120A to a total number of crashes of the browser component independent of (or without regard to) the executable 116. In other implementations, crash report analyzer 160 may compute a ratio of the number of crashes of the browser 110 that are associated with the executable 120A to the number of crashes of the browser 110 independent of the executable 120A. These examples are not intended to be limiting and any other ratios or functions may be computed by crash report analyzer 160.

For example, crash report analyzer may determine that browser component 116A crashed or experienced a fault in operation 20 times when executable 120A was present in memory space 114 and crashed a total of 22 times independent of (or without regard to) the executable 116. In this example scenario, crash report analyzer 160 may compute a ratio of the number of crashes of the browser component 116A that are associated with the executable 120A (e.g., 20) to the total number of crashes of the browser component independent of (or without regard to) the executable 116 (e.g., 22) as 0.9 (e.g., 20 divided by 22). It is to be appreciated that this example ratio is purely illustrative and is not intended to limit the embodiments. Crash report analyzer 160 may use any other ratio or function for executable 120A based on the number of crashes of the browser component 116A that are associated with the executable 120A and the number of crashes of the browser component independent of the executable 116A. In some implementations, such a ratio (or any other function) may be computed for each executable 120A-N. The results of the ratios or functions may be stored in data structure 164 by crash report analyzer 160 in association with their respective executables 120A-N.

In some implementations, crash report analyzer 160 may also take into consideration a total number of browser crashes determined by crash report analyzer 160. As an example, the fault level for a particular executable, such as executable 120A, may be a function of a total number of crashes and the ratio of a number of crashes of a browser component that is associated with the executable and a number of crashes of the browser component independent of the executable. For example, the fault level may be a function of the ratio (e.g., 0.9) and the total number of browser crashes (e.g., 1000). The function may itself be a ratio (e.g., 0.9/1000) or any other function that may include weights for different components of the function.

In some implementations, once a fault level is computed for one or more executables 120A-N, the fault level for the executables is compared to a threshold fault level. In some implementations, the threshold fault level may be preset to a particular value. In other implementations, the threshold value may vary based on analysis crash reports received at crash report analyzer 160 from different clients 180. Crash report analyzer 160 may then determine if the fault level for a particular executable (e.g., executable 120A) has traversed the threshold fault level. If the fault level for the particular executable has traversed the threshold fault level, an identifier (e.g., identifier 122A) representing the executable may be included in BEL 168 by crash report analyzer 160. For example, crash report analyzer 160 may determine if the fault level for executable 120A is greater than the threshold fault level, and include an identifier 122A representing executable 120A in BEL 168. In this way, one or more executables 120A-N may be blacklisted by including identifiers 122A-N representing the executables 120A-N in BEL 168. Furthermore, blacklisting in accordance with the disclosed implementations is performed automatically by crash report analyzer 160 and without user intervention.

In some implementations, crash report analyzer 160 may utilize dynamic or pre-configured rules and heuristics to determine a whether an executable is to be included in BEL 168. As an example, crash report analyzer 160 may take into consideration historical patterns of crashes associated with an executable to determine whether an executable identifier is to be included in BEL 168 with or without regard to a determined fault level of the executable. In one non-limiting example, if an executable 120D is associated with numerous crashes for a single browser identifier, crash report analyzer 160 may determine that executable identifier 122D representing executable 120D is not to be included in BEL 168 because the crash affects only a single browser. On the other hand, for example, an executable 120E is associated with a single crash instance, but for numerous distinct browser identifiers, executable identifier 122E representing executable 120E may be included in BEL 168. Even if executable 120E is associated with a single crash per browser identifier, the executable has affected numerous browsers with distinct browser identifiers and may be determined to be faulty by crash report analyzer 160. Accordingly, executable identifier 122E representing executable 120E may be included by crash report analyzer 160 in BEL 168.

In another example, crash report analyzer 160 may detect a rate of increase of crashes associated with executable 120C and determine that executable 120C may need to be blacklisted when the rate of crashes associated with the executable 120C increases beyond a predetermined threshold. In another example, crash report analyzer 160 may detect that an average value of crashes associated with executable 120C over a particular time frame has traversed (e.g., risen above) a threshold value and determine that executable 120C may need to be blacklisted by storing an identifier 122C associated with executable 120C in BEL 168. These examples are purely illustrative and are not intended to limit the disclosed implementations.

In some implementations, crash report analyzer 160 may analyze crash reports in real-time to determine a rise or drop in crash activity associated with one or more executables 120A-N. For example, if crash report analyzer 160 has determined that there is a increase in crash activity associated with an executable 120J that is inconsistent with a historic pattern of crash activity associated with executable 120J, executable 120J's identifier 122J may be included in BEL 168. In some implementations, identifiers of blacklisted executables may be directly transmitted to client 180 without storage at BEL 168.

In some implementations, crash report analyzer 160 may remove one or identifiers of blacklisted executables from BEL 168. Such removal may be performed by crash report analyzer 160 based on an analysis of crash activity pattern associated with the blacklisted executables. For example, crash report analyzer 160 may determine that a rate of crashes associated with executable 120C has decreased and proceed to remove an identifier 122C associated with executable 120C from BEL 168. In another example, crash report analyzer 160 may detect that an average value of crashes associated with executable 120C over a particular time frame has traversed (e.g., fallen below) a threshold value and may remove an identifier 122C associated with executable 120C from BEL 168.

In some implementations, crash report analyzer 160 may provide content of BEL 168, which may include one or more identifiers 122A-N of blacklisted executables 120A-N, to crash report manager 130 at client 180 over network 150. Crash report manager 130 may store the received contents of BEL 168 in BEL 142. BEL 142 may be read by browser 110 at any time or at startup of the browser 110 to identify one or more blacklisted executables 120A-N corresponding to the blacklisted identifiers 122A-N. Browser 110 may prevent future inclusion of the software code of the blacklisted executables into memory space 114 of browser 110. This may prevent future crashes of browser components 116A-N and consequently browser 110. Prevention of crashes of browser 110 resulting from blacklisting of executables increases operational stability of browser 110 and can improve a user's browsing experience. It is to be appreciated that crash report analyzer 160 can provide identifiers of blacklisted executables from BEL 168 to a plurality of clients and browsers at the clients. Content of BEL 168 may be provided to the plurality of clients at predetermined intervals or when browsers at the clients perform software updates. In this way, BELs at one or more clients may be synchronized with the contents of BEL 168 at server 190.

In some implementations, crash report manager 130 may perform the functions of crash report analyzer 160 discussed herein. For example, crash report manager may also analyze crash reports and may include one or more executable identifiers in BEL 142. In this way, in some implementations, crash reports may be analyzed at client 180 and need not be provided to server 190.

Figure 2:
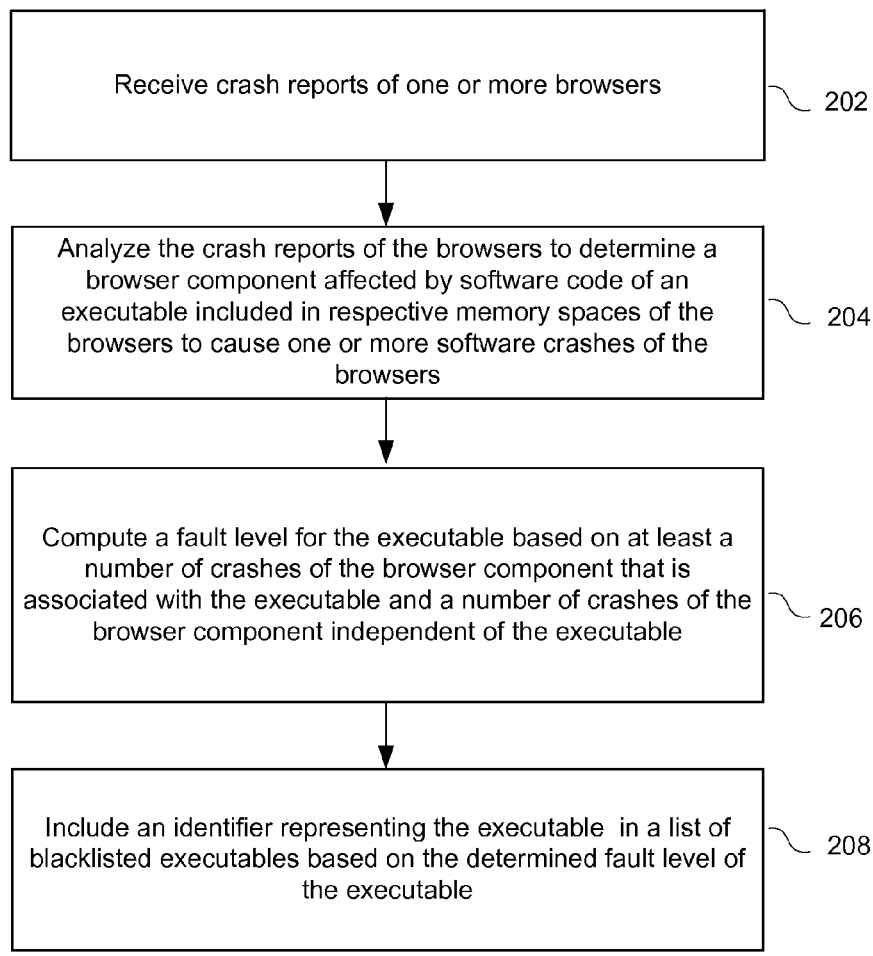
FIG. 2 illustrates an example process for blacklisting of fault generating software code.

FIG. 2 illustrates an example process 200 for blacklisting of fault generating software code at the example server 190 of FIG. 1. While FIG. 2 is described with reference to FIG. 1, it should be noted that the process steps of FIG. 2 may be performed by other systems.

Process 200 begins with receiving crash reports of one or more browsers (step 202). A crash report may include an identification of one or more executables related to the crash, where software code of the executables is included in a memory space of the browser during the software crash. As an example, the crash report can be generated and provided by crash report manager 130 and received at crash report analyzer 160 at server 190 over network 150.

Process 200 proceeds by analyzing the crash reports of the one or more browsers to determine a browser component affected by software code of an executable included in respective memory spaces of the browsers to cause one or more software crashes of the browsers (step 204). As an example, crash report analyzer 160 may determine one of more browser components 116A-N that are affected by one or more executables 120A-N that may be fault generating or buggy.

For the executable, a fault level is computed based on at least a number of crashes of the browser component that is associated with the executable and a total number of crashes of the browser component independent of the executable (step 206). For example, crash report analyzer may determine that browser component 116A crashed or experienced a fault in operation 20 times when executable 120A was present in memory space 114 and crashed a total of 22 times independent of (or without regard to) the executable 116. In this example scenario, crash report analyzer 160 may compute a ratio of the number of crashes of the browser component 116A that are associated with the executable 120A (e.g., 20) to the total number of crashes of the browser component independent of (or without regard to) the executable 116 (e.g., 22) as 0.9 (e.g., 20 divided by 22). It is to be appreciated that this example ratio is purely illustrative and is not intended to limit the embodiments. The implementations discussed herein may compute other ratios based on any number of browser crashes at one or more clients and any number of crashes associated with one or more executables.

Then, an identifier representing the executable is included in a list of blocked executables based on the determined fault level of the executable (step 208). For example, crash report analyzer 160 may then determine if the fault level for a particular executable (e.g., executable 120A) has traversed a threshold fault level (e.g., 25). If the fault level for the particular executable has traversed the threshold fault level, an identifier (e.g., identifier 122A) representing the executable may be included in BEL 168 by crash report analyzer 160. As discussed above, a total number of crashes of the browser component may also be given consideration when determining the fault level.

In some implementations, the list of the blocked executables may be provided to a plurality of browsers. The browsers may prevent future inclusion of the software code of the blocked executables into respective memory spaces of the browsers. This may prevent future crashes of the browser component resulting from the executable and can result in increased operational stability of the browsers. Improved operational stability of a browser can enhance a user's browsing experience.

Figure 3:
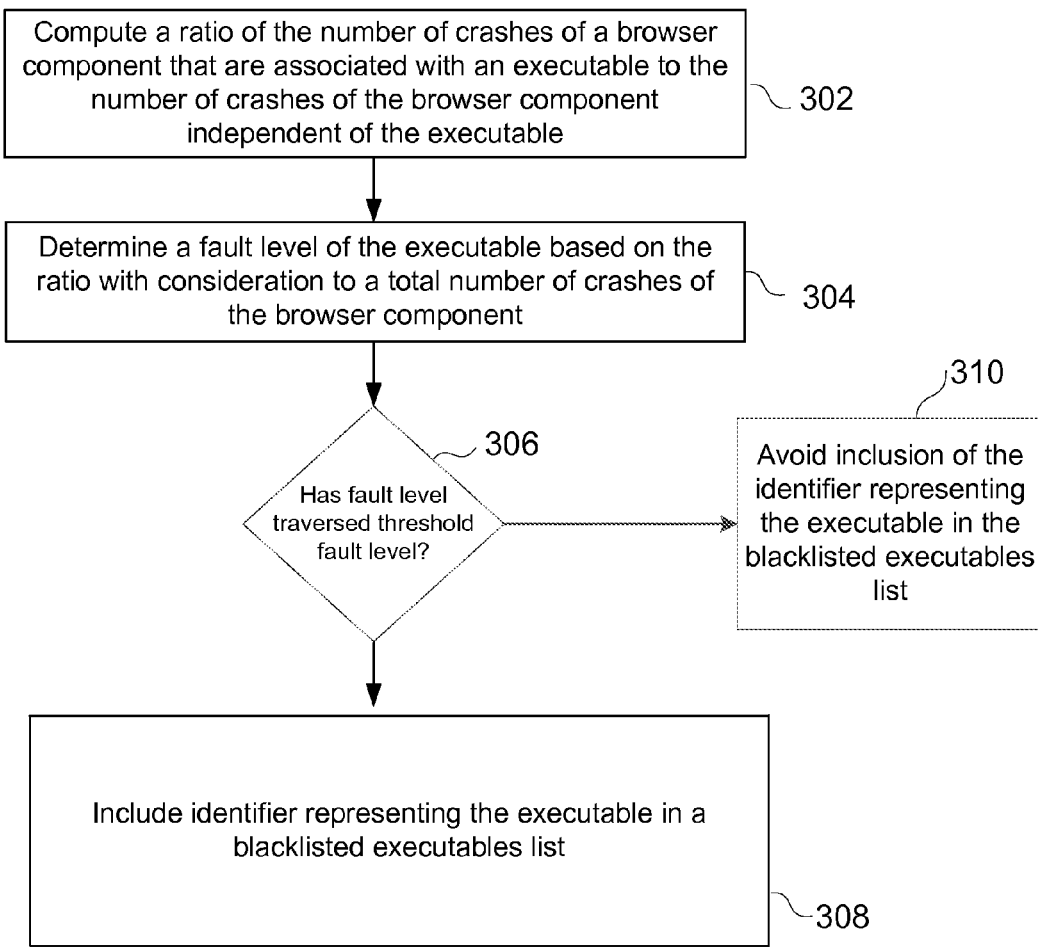
FIG. 3 illustrates another example process for blacklisting of fault generating software code.

FIG. 3 illustrates an example process 300 for blacklisting of fault generating software code at the example server 190 of FIG. 1. While FIG. 3 is described with reference to FIG. 1, it should be noted that the process steps of FIG. 3 may be performed by other systems.

Process 300 begins by computing a ratio of the number of crashes of a browser component that are associated with an executable to the number of crashes of the browser component independent of (or without regard to) the executable (step 302). As an example, the executable may be an executable identified after filtering one or more identified approved executables needed for operation of browser 110 and executables that may affect a smaller number of browsers relative to a total number of browsers.

Process 300 may then determine the fault level of the executable based on the ratio with consideration to a total number of crashes of the browser component (step 304). As an example, the fault level for a particular executable, such as executable 120A, may be a function of a total number of crashes and the ratio of a number of crashes of a browser component that is associated with the executable and a total number of crashes of the browser component independent of (or without regard to) the executable. For example, the fault level may be a function of the ratio (e.g., 0.9) and the total number of browser crashes across different clients (e.g., 1000). The function may itself be a ratio (e.g., 0.9/1000) or any other function that may include weights for different components of the function.

If the fault level has traversed (e.g., greater than) a threshold fault level (Yes, step 306), an identifier representing the executable may be included in a blacklisted executables list (step 308). For example, crash report analyzer 160 may determine that the fault level for a particular executable (e.g., executable 120A) has traversed the threshold fault level. If the fault level for the particular executable has traversed the threshold fault level, an identifier (e.g., identifier 122A) representing the executable 120A may be included in BEL 168 by crash report analyzer 160.

If the fault level has not traversed a threshold fault level (No, step 306), an identifier representing the executable may not be included in a blacklisted executables list (step 310). In some implementations, one or more steps 302 through 310 may be repeated for each executable identified in a crash report received from crash report manager 130 to build BEL 168.

Figure 4:
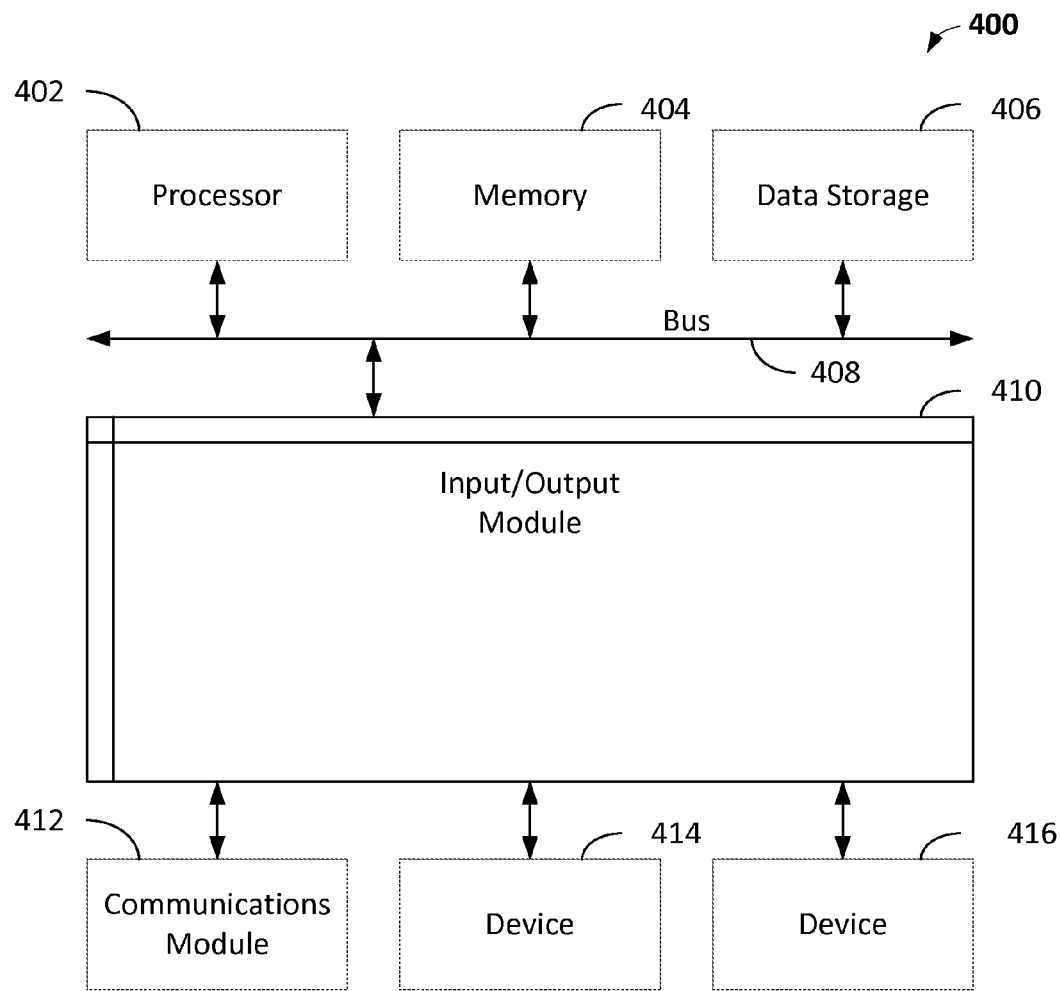
FIG. 4 conceptually illustrates an example electronic system in which some configurations are implemented.

FIG. 4 is a block diagram illustrating an example computer system 400 with which client 180 and server 190 of FIG. 1 can be implemented. In certain aspects, the computer system 400 may be implemented using hardware or a combination of software and hardware, either in a dedicated server, or integrated into another entity, or distributed across multiple entities.

Computer system 400 (e.g., client 180 and server 190) includes a bus 408 or other communication mechanism for communicating information, and a processor 402 (e.g., processor 112 and 166) coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404 (e.g., memory 182 and 192), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. Processor 402 and memory 404 can be supplemented by, or incorporated in, special purpose logic circuitry.

The instructions may be stored in memory 504 and implemented in one or more computer program products, e.g., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Example input/output modules 410 include data ports such as USB ports. The input/output module 410 is configured to connect to a communications module 412. Example communications modules 412 (e.g., communications module 118 and 168) include networking interface cards, such as Ethernet cards and modems. In certain aspects, the input/output module 410 is configured to connect to a plurality of devices, such as an input device 414 (e.g., input device 119) and/or an output device 416 (e.g., output device 117). Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a LED (light emitting diode), CRT (cathode ray tube), or LCD (liquid crystal display) screen, for displaying information to the user.

According to one aspect of the present disclosure, client 180 and server 190 can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 402 for execution. Such a medium may take many forms, including, but not limited to, non-volatile media, volatile media, and transmission media. Non-volatile media include, for example, optical disks, magnetic disks, or flash memory, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method comprising:
receiving, over a network, respective crash reports for a plurality of browsers, each crash report including an identification of one or more executables related to a software crash of one of the plurality of browsers, wherein software code of the one or more executables is included in a memory space of the one of the plurality of browsers during the software crash;
analyzing the plurality of received crash reports together to determine a browser component affected by software code of an executable included in respective memory spaces of the plurality of browsers to cause one or more software crashes of the browsers;
computing, for the executable, a fault level based on at least a number of crashes of the browser component that is associated with the executable and a number of crashes of the browser component independent of the executable; and
including an identifier representing the executable in a list of blacklisted executable identifiers based on the determined fault level of the executable.

2. The method of claim 1, further comprising:
providing the list of the blacklisted executables to the browsers, wherein the browsers prevent future inclusion of the software code of the blacklisted executables into respective memory spaces of the browsers.

3. The method of claim 1, the analyzing further comprising:
identifying, from the crash reports, one or more approved executables supporting operation of the browsers, wherein the identified approved executables are proscribed from inclusion in the list of blacklisted executable identifiers.

4. The method of claim 1, the computing further comprising:
computing a ratio of the number of crashes of the browser component that are associated with the executable to the number of crashes of the browser component independent of the executable; and
determining the fault level based on the ratio with consideration to a total number of crashes of the browser component.

5. The method of claim 1, further comprising:
determining if the fault level has traversed a threshold fault level; and
including the identifier representing the executable in a list of blacklisted executable identifiers when the fault level has traversed the threshold fault level.

6. The method of claim 1, further comprising:
reading a browser identifier from a crash report; and
storing the browser identifier in a data structure, wherein the data structure includes one or more browser identifiers identifying the plurality of browsers.

7. The method of claim 6, further comprising:
counting unique identifiers in the data structure; and
determining a number of browser crashes based on the count.

8. The method of claim 1, wherein the browser component includes at least one of a browser process and a rendering engine process.

9. A non-transitory machine-readable medium comprising instructions stored therein, which when executed by a processor, causes the processor to perform operations comprising:
receiving, over a network, respective crash reports for a plurality of browsers, each crash report including an identification of one or more executables related to a software crash of one of the plurality of browsers, wherein software code of the one or more executables is included in a memory space of the one of the plurality of browsers during the software crash;
analyzing plurality of received crash reports together to determine a browser component affected by software code of an executable included in respective memory spaces of the plurality of browsers to cause one or more software crashes of the browsers;
computing, for the executable, a fault level based on at least a number of crashes of the browser component that is associated with the executable and a number of crashes of the browser component independent of the executable; and
including an identifier representing the executable in a list of blacklisted executable identifiers based on the determined fault level of the executable.

10. The non-transitory machine-readable medium of claim 9, the operations further comprising:
providing the list of the blacklisted executables to the browsers, wherein the browsers prevent future inclusion of the software code of the blacklisted executables into respective memory spaces of the browsers.

11. The non-transitory machine-readable medium of claim 9, the analyzing further comprising:
identifying, from the crash reports, one or more approved executables supporting operation of the browsers, wherein the identified approved executables are proscribed from inclusion in the list of blacklisted executable identifiers.

12. The non-transitory machine-readable medium of claim 9, the computing further comprising:
computing a ratio of the number of crashes of the browser component that are associated with the executable to the number of crashes of the browser component independent of the executable; and
determining the fault level based on the ratio with consideration to a total number of crashes of the browser component.

13. The non-transitory machine-readable medium of claim 9, the operations further comprising:
determining if the fault level has traversed a threshold fault level; and
including the identifier representing the executable in a list of blacklisted executable identifiers when the fault level has traversed the threshold fault level.

14. The non-transitory machine-readable medium of claim 9, the operations further comprising:
reading a browser identifier from a crash report; and
storing the browser identifier in a data structure, wherein the data structure includes one or more browser identifiers identifying the plurality of browsers.

15. The non-transitory machine-readable medium of claim 14, the operations further comprising:
counting unique identifiers in the data structure; and
determining a number of browser crashes based on the count.

16. The non-transitory machine-readable medium of claim 9, wherein the browser component includes at least one of a browser process and a rendering engine process.

17. A system comprising:

a memory comprising instructions; and a processor configured to execute the instructions to:

receive, over a network, respective crash reports for a plurality of web applications configured to retrieve content from a web server, each crash report including an identification of one or more executables related to a software crash of one of the plurality of web applications, wherein software code of the one or more executables is included in a memory space of the one of the plurality of web applications during the software crash;

analyze the plurality of received crash reports of the web applications together to determine a web application component affected by software code of an executable included in respective memory spaces of the plurality of web applications to cause one or more software crashes of the web applications;

compute, for the executable, a fault level based on at least a number of crashes of the application component that is associated with the executable and a number of crashes of the application component independent of the executable; and include an identifier representing the executable in a list of blacklisted executable identifiers based on the determined fault level of the executable.

18. The system of claim 17, wherein the processor is further configured to execute the instructions to:

provide the list of the blacklisted executables to the web applications, wherein the web applications prevent future inclusion of the software code of the blacklisted executables into respective memory spaces of the web applications.

19. The system of claim 17, wherein the processor is further configured to execute the instructions to:

identify, from the crash report, one or more approved executables supporting operation of the web applications, wherein the identified approved executables are proscribed from inclusion in the list of blacklisted executable identifiers.

20. The system of claim 17, wherein the processor is further configured to execute the instructions to:

compute a ratio of the number of crashes of the web application component that are associated with the executable to the number of crashes of the web application component independent of the executable; and determine the fault level based on the ratio with consideration to a total number of crashes of the web application component.

\* \* \* \* \*